No. 666,583.  
J. R. WILLIAMS.  
HORSESHOE CALK.  
(Application filed Dec. 28, 1899.)
Patented Jan. 22, 1901.
(No Model.)
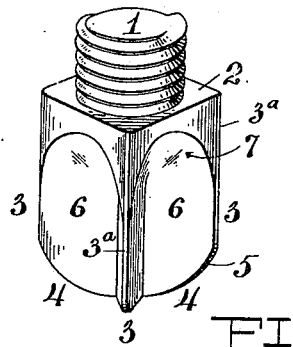
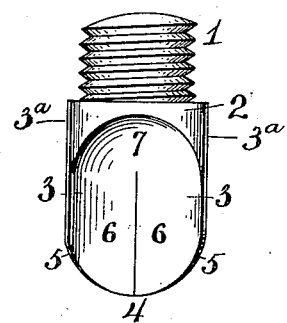   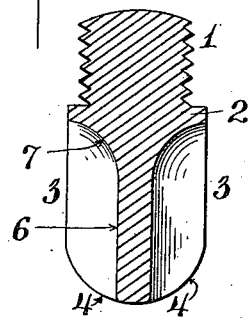
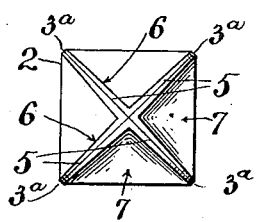   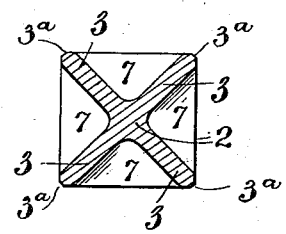
WITNESSES
INVENTOR
John R. Williams.
By Knight Bros
Attorneys

UNITED STATES PATENT OFFICE.

JOHN R. WILLIAMS, OF SCRANTON, PENNSYLVANIA.

HORSESHOE-CALK.

SPECIFICATION forming part of Letters Patent No. 666,583, dated January 22, 1901.

Application filed December 28, 1899. Serial No. 741,860. (No model.)

*To all whom it may concern:*

Be it known that I, JOHN R. WILLIAMS, a citizen of the United States, and a resident of Scranton, in the county of Lackawanna and State of Pennsylvania, have invented certain new and useful Improvements in Horseshoe-Calks, of which the following is a specification.

My invention relates to removable calks for the heels and toes of horseshoes—that is to say, calks which may be securely attached to the shoe to serve the purpose of preventing slipping and may be removed when worn and replaced by new calks without the necessity of removing the shoe from the foot of the animal.

My invention has for its object to provide an article of this character which may be forged from high-grade calk-steel, which will be more effective and durable in use, will avoid liability of turning the animal's ankles, will maintain its advantageous features until practically worn out, and when worn out will still be in a condition to permit convenient removal without taking off the shoe.

To this end my invention consists in a horseshoe-calk constructed with an attaching screw-shank, a square base, radial blades having vertical flattened beveled edges, vertical straight sides and rounded, beveled, outwardly-tapering knife-edge lower ends providing a conoidal-shaped tread, and arching recesses between the blades beneath the square base, as hereinafter described and claimed.

In order that my invention may be fully understood, I will proceed to describe it with reference to the accompanying drawings, in which—

Figure 1 is a perspective view; Fig. 2, a side view; Fig. 3, a vertical section; Fig. 4, a bottom view, and Fig. 5 a horizontal section through a calk embodying the features of my present invention.

The calk is attached to the shoe by means of a threaded shank 1 protruding from the square base 2. Projecting downward from the square base 2 are four blades 3, having flattened beveled edges 3ª and radiating symmetrically from the center, as shown in Figs. 4 and 5, rounded on their lower ends from the center outward to provide a conoidal tread, as shown at 4 in Figs. 1, 2, and 3, tapering from the center outward, as shown in Fig. 5, to give sufficient draft in forging, and beveled at their lower ends, as shown at 5 in Figs. 2, 3, and 4, for the purpose of providing them with a suitable knife-edge, and constructed for the greater part of their length with straight vertical sides 6, as shown in Fig. 1. The blades 3 are joined to the base 2 in a manner to produce arching bases 7 to said blades, incident to which are recesses which will receive a tool or wrench for screwing and unscrewing the calk. A further advantage arising from the enlargement of the blades at the point of attachment to the base is that the cost of manufacture is thereby lessened and rendered easy, inasmuch as it is my practice to strike up the calks by drop-forging from horseshoe-calk steel.

By having the main depth of the blades of reduced thickness with straight vertical sides a sufficiently-reduced transverse dimension to insure penetration of slippery surfaces is maintained throughout the life of the calk. By rounding the corners to provide a conoidal tread the surface of the lower edge, which maintains substantially the shape shown throughout the life of the calk, is increased and corners are avoided, which would tend to turn the foot of the animal and cause a sprain when the foot is not placed perpendicularly upon uneven surfaces.

It will be observed that with the peculiar arched shape of the connection of the blades with the base the calk will begin to get smooth and call attention to the necessity for changing in ample time before the base becomes materially worn and while there is ample wrench-hold by which to unscrew the stump. Calks as heretofore constructed have generally been such that before attention is called to their being worn out they have been reduced to such an extent that they cannot be unscrewed and it is necessary to remove the shoe and punch them out, thus necessitating again threading the socket in the shoe.

Having thus described my invention, the following is what I claim as new therein and desire to secure by Letters Patent:

A horseshoe-calk constructed with an attaching screw-shank, a square base, radial blades having vertical flattened beveled edges, vertical straight sides, and rounded, beveled, outwardly-tapering knife-edge lower ends providing a conoidal-shaped tread, and arching recesses between the blades beneath the square base, the widening of the inner ends of the blades to form the arching recesses preventing the calk from becoming completely worn down so as to leave a wrench-hold.

Signed at Scranton, in the county of Lackawanna and State of Pennsylvania, this 13th day of November, 1899.

JOHN R. WILLIAMS.

Witnesses:
FRED R. STARK,
JOHN FITZSIMMONS.